(12) United States Patent
Sundararajan

(10) Patent No.: US 6,769,914 B2
(45) Date of Patent: Aug. 3, 2004

(54) ARITHMETIC TEACHING DEVICE

(76) Inventor: Kalyani Sundararajan, 26 Royal Dominion Ct., Bethesda, MD (US) 20817

(*) Notice: Subject to any disclaimer, the term of this patent is extended or adjusted under 35 U.S.C. 154(b) by 0 days.

(21) Appl. No.: 10/285,495

(22) Filed: Nov. 1, 2002

(65) Prior Publication Data

US 2004/0086836 A1 May 6, 2004

(51) Int. Cl.[7] ............................................. G09B 19/02
(52) U.S. Cl. ...................................... 434/191; 434/209
(58) Field of Search ................................ 434/191, 209, 434/197, 198, 199, 322, 323

(56) References Cited

U.S. PATENT DOCUMENTS

| 565,797 A | * | 8/1896 | Roller ........................ 434/199 |
| 649,054 A | | 5/1900 | Holibaugh |
| 1,687,130 A | * | 10/1928 | Hunau et al. ................ 235/1 R |
| 2,910,786 A | | 11/1959 | Cohn et al. |
| 3,735,504 A | | 5/1973 | Fedyna |
| 3,757,433 A | | 9/1973 | Robinson et al. |
| 3,808,708 A | | 5/1974 | Huskin |
| 4,445,865 A | | 5/1984 | Sellon |
| 4,790,757 A | | 12/1988 | Takahashi |
| 5,449,890 A | | 9/1995 | Van Neck |
| 5,769,639 A | | 6/1998 | Foster |

* cited by examiner

Primary Examiner—Jacob K. Ackun
Assistant Examiner—Jamila Williams
(74) Attorney, Agent, or Firm—Stephen R. Greiner

(57) ABSTRACT

An arithmetic teaching device including a base plate bearing a table with numerical indicia and a cover plate secured atop the base plate. The cover plate is provided with a number of slots configured to permit the numerical indicia in the table to be viewed through the slots. A number of slides are positioned in the slots between the base plate and the cover plate, each of the slides has a length about half that of the slots.

3 Claims, 1 Drawing Sheet

ARITHMETIC TEACHING DEVICE

FIELD OF THE INVENTION

The present invention relates generally to devices for the purposes of education and demonstration and, more particularly, to such devices for teaching mathematics with elements that slide within windows provided in a card.

BACKGROUND OF THE INVENTION

Multiplication tables have long been used to teach students basic arithmetic skills. Unfortunately, many individuals find multiplication tables to be confusing and put them to minimal use. Teaching multiplication with conventional, multiplication tables can, thus, be a slow and tedious process. A need, therefore, exists for a device that makes using a multiplication table fun and easy thereby accelerating the transmission of arithmetic skills to a student.

SUMMARY OF THE INVENTION

In light of the problems associated with conventional, multiplication tables, it is a principal object of the invention, to provide an arithmetic teaching device that permits a user to access a multiplication-table in a fun and easy manner. Learning and memorizing a multiplication table is accomplished intuitively.

It is another object of the invention to provide an arithmetic teaching device of the type described that is self-contained and requires neither additional tools nor prolonged training to operate effectively.

It is a further object of the invention to provide an arithmetic teaching device of the type described that permits a user to quickly solve many types of arithmetic problems. For example, the device can be used to find: the products of any two numbers, least common multiples, equivalent fractions, factors of a number, and the greatest common factor of two numbers. The device can also be employed to solve perfect divisor division problems.

It is an object of the invention to provide improved elements and arrangements thereof in an arithmetic teaching device for the purposes described which is uncomplicated in construction, inexpensive to manufacture, and fully dependable in use.

Briefly, the device in accordance with this invention achieves the intended objects by featuring a base plate bearing a multiplication table with numbers arrayed in rows and columns. A cover plate is secured atop the base plate and has a plurality of slots configured to permit the rows of numbers in the table to be separately viewed through the slots. The cover plate is provided with numbers across its top that mark the columns in the table and with numbers at its side that mark the rows in the table. A plurality of slides is positioned in the slots between the base plate and the cover plate. Each of the slides is capable of sliding movement wherein any number in its associated row of the table can be uncovered thereby.

The foregoing and other objects, features and advantages of the present invention will become readily apparent upon further review of the following detailed description of the preferred embodiment as illustrated in the accompanying drawings.

BRIEF DESCRIPTION OF THE DRAWINGS

The present invention may be more readily described with reference to the accompanying it drawings, in which.

Similar reference characters denote corresponding features consistently throughout the accompanying drawings.

DETAILED DESCRIPTION OF THE PREFERRED EMBODIMENT

Figure 3:
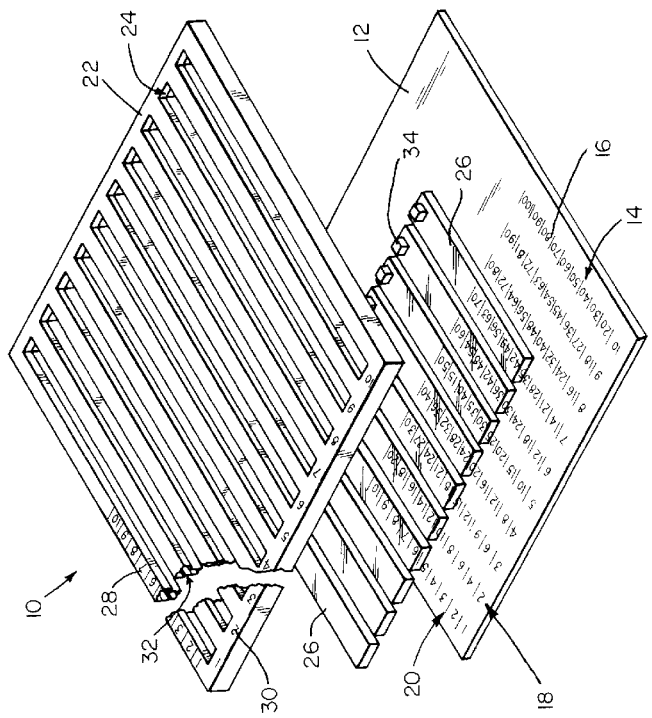
FIG. 3 is an exploded perspective view of the arithmetic teaching device with portions broken away to reveal details thereof.
Figure 2:
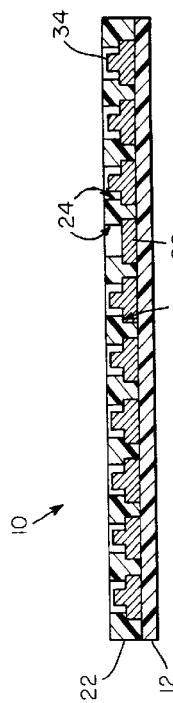
FIG. 2 is a cross-sectional view taken along line 2—2 of FIG. 1.

Referring now to the FIGS., an arithmetic teaching device in accordance with the present invention is shown at 10. Teaching device 10 includes a base plate 12 bearing a multiplication table 14 upon its front surface with numerical indicia as at 16 arrayed in rows 18 and columns 20. A cover plate 22 is secured atop base plate 12 and has a plurality of horizontal slots 24 configured to permit each row 18 of table 14 to be separately viewed through slots 24. A plurality of slides 26 is captured between base plate 12 and cover plate 22. Slides 26 can be moved within slots 24 to selectively expose indicia 16 in table 14 and assist a user in solving arithmetic problems.

Base plate 12 is thin, stiff and rectangular in outline. Preferably, base plate 12 is sized for holding in the hands of a user but can be made larger or smaller if desired. Base plate 12 can be formed of plastic or any other suitable material.

Multiplication table 14 is applied to base plate 12 by printing, embossing, or any other method. As shown, table 14 is positioned upon the left half of base plate 12 so that the right half of base plate 12 is left blank. Table 14 shows the results of multiplying each number of a series represented by indicia 28 (the numbers 1 to 10 are shown) marked across the top of cover plate 22 by each number of another series represented by indicia 30 (the numbers 1 to 10 are also employed here) marked across the left hand side of cover plate 22. Indicia 16 comprising table 14 are arranged in columns 20 topped by individual indicia 28 and rows 18 extending horizontally from individual indicia 30.

Cover plate 22 is thin, stiff, dimensioned like base plate 12 and is formed of plastic or other suitable material. Slots 24 in cover plate 22 extend from one side of cover plate 22 to the other and have lengths about double the width of table 14. When positioned atop base plate 12, table 14 is seen in the left halves of slots 24. The bottoms of slots 24 are countersunk or enlarged so as to provide each with a peripheral flange 32. Each flange 32 is preferably arranged parallel to the front surface of base plate 12.

Figure 1:
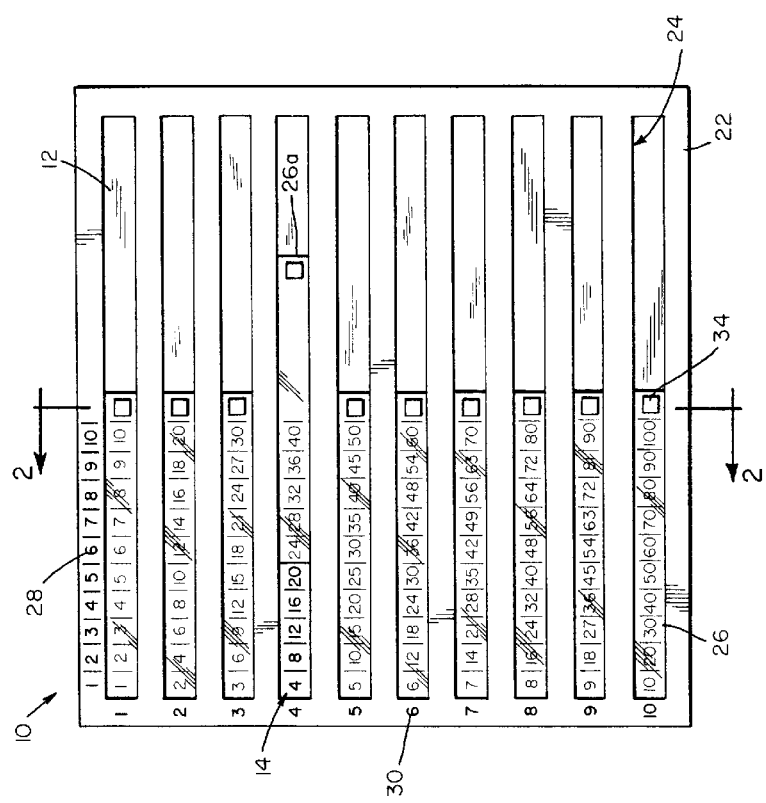
FIG. 1 is a front view of an arithmetic teaching device in accordance with the present invention.

Each slide 26 is dimensioned to slide easily along the length of a slot 24 between a peripheral flange 32 and the front surface of base plate 12. Preferably, each slide 26 is a thin strip of stiff plastic or like material having a length sufficient to cover one row 18 of table 14 when positioned at its leftmost position as illustrated in FIG. 1 and to fully expose the same row 14 to view when positioned at its rightmost position. A tab 34 at the end of each slide 26 permits each slide 26 to be easily moved to the left and right with a light push from a user.

Slides 26 are shown in the FIGS. as being transparent for the sake of convenience in illustrating table 14. In commercial embodiments of device 10, slides 26 can be made opaque or translucent to hide table 14 from a user and enhance teaching opportunities. In the commercial embodiment of device 10, slides 26 must be moved to confirm the answers to selected problems in arithmetic. Thus, there can be no "cheating" in solving arithmetic problems with a device 10 having slides 26 that a student cannot peer through.

Device 10 can be used to solve a variety of arithmetic problems in a straightforward manner. For example, the product of two numbers like "4" and "5" can be found by locating slide 26a adjacent the "4" in indicia series 30 and moving such to the right to expose the number, here "20," in column 20 beneath the "5" in indicia series 28. In the alternative, the user could locate the slide 26 adjacent the "5" in indicia series 30 and move such to the right to expose the number beneath the "4" in indicia series 28 to reveal "20." Thus, a user is taught that the order of multiplication has no bearing on outcome. Repeated use of device 10 in this manner makes memorizing multiplication table 14 a fun and easy task.

Device 10 can be used to find the products of numbers not altogether seen in table, for example "16" and "6". A user can express this problem as being equivalent to: [(10+6)×6] or [(10×6)+(6×6)]. In the manner noted in the previous paragraph, a user need only move the appropriate slides 26 to determine the products of "10" and "6" as well as "6" and "6" and, then, add them together. Repeated practice with double-digit numbers teaches a user the concept of splitting "16" into "10" and "6" (or any other combination of numbers that sum to 16) and the concept of commutativity, which distributes a product across a sum.

Arithmetic problems involving perfect divisor division can be quickly solved with device 10. Supposing a user desires to divide "48" by "6", all he must do to find the answer is to locate the slide 26 opposite the "6" in indicia series 30 and then move such to the right to reveal the "48" in table 14. The "8" in indicia series 28, forming the head of the column 20 in which the "48" is located, is the answer to the problem. Working such problems teaches a user that division is the inverse of multiplication. So, not only is 48/6=8, but 6×8=48.

Least common multiples (LCMs) can be found with device 10. Suppose, for example, that it is desired to determine the LCM of "6" and "9". To accomplish this, a user need only locate the slides 26 opposite the "6" and the "9" in indicia series 30 and, then, move both slides 26 simultaneously to the right until there is a number common to both of the now exposed rows 18. The matching number will be the LCM. In the case of "6" and "9", 18 is the LCM.

Equivalent fractions can be determined easily with device 10. To find the equivalent fractions for 3/7, for example, a user would locate the slides 26 opposite the "3" and the "7" in indicia series 30 and, then, move each slide 26 to the right one column 20 at a time. Each corresponding set of numbers revealed in each successive column 20 provides an equivalent fraction that is equal to 3/7, i.e., 6/14, 9/21, 12/28... 30/70.

All of the factors of the number "81" can be easily found with device 10. To do this, he would move all of the slides 26 simultaneously to the right until the number "81" is revealed in table 14. The first instance of "81" appearing in table 14 would be in the row 18 to the right of "9" in indicia series 30 and the column 20 headed by "9" in indicia series 28. Then, a user would repeat this step in order to locate the first instance where "9" appears in table 14 which is in the row 18 to the right of "3" in indicia series 30 and the column 20 headed by "3" in indicia series 28. Since "3" is a prime number, no more work with device 10 need be done. However, a final check is conducted by multiplying the two uncovered factors ("3" and "9") together. Since the product of "3" and "9" is "27" (a number smaller than "81"), then this number is also a factor. Thus, the complete set of factors of "81" is "3", "9", and "27".

A user can determine the greatest common factor (GCF) of two numbers with device 10 by moving all slides 26 sequentially from bottom to top and locating the lowermost slide 26 that reveals both of the numbers in a single row 18. The number in series 30 adjacent said lowermost slide 26 is the GCF of the two numbers. For example, suppose one wishes to determine the GCF of "48" and "54". Upon moving each slide 26 as described, a user would find that the slide 26 adjacent "6" in indicia series 30 contains numerical indicia "48" and "54". Therefore, "6" is the GCF of "48" and "54".

From the foregoing, it will be appreciated that device 10 can be easily used to solve a variety of arithmetic problems. By manipulating slides 26, a user can block out extraneous information in table 14 that may appear confusing so that problems can be solved quickly. Learning arithmetic, thus, becomes fun and progresses rapidly.

While the invention has been described with a high degree of particularity, it will be appreciated by those skilled in the art that modifications may be made thereto. For example, table 14 need not be a multiplication table but can be any array of numbers useful for solving arithmetic problems. Furthermore, although table 14 is positioned upon the left side of base plate 12 in a manner that has been found well suited for most users, table 14 could be positioned upon any half of base plate 12 with the other features of device 10 being oriented to permit selective movement of slides to uncover numerical indicia 16 in table 14. Therefore, it is to be understood that the present invention is not limited to the sole embodiment described above, but encompasses any and all embodiments within the scope of the following claims.

I claim:

1. An arithmetic teaching device comprising:

a base plate bearing a table with numerical indicia;

a cover plate secured atop said base plate, said cover plate being provided with a plurality of slots configured to permit said numerical indicia on said table to be viewed through said slots; and, a plurality of slides positioned in said slots between said base plate and said cover plate, each of said slides having a length about half that of said slots.

2. An arithmetic teaching device, comprising:

a base plate bearing a multiplication table with numerical indicia arrayed in rows and columns;

a cover plate secured atop said base plate, said cover plate being provided with a plurality of countersunk slots configured to permit said rows of numerical indicia in said multiplication table to be separately viewed through said slots; and, a plurality of slides positioned in said slots between said base plate and said cover plate, each of said slides being capable of sliding movement between a first position wherein said numerical indicia in one of said rows is covered thereby and a second position wherein said numerical indicia in the same one of said rows is uncovered thereby.

3. An arithmetic teaching device, comprising:

a base plate bearing a multiplication table with first numerical indicia arrayed in rows and columns;

a cover plate secured atop said base plate, said cover plate being provided with a plurality of countersunk slots configured to permit said rows of first numerical indicia in said multiplication table to be separately viewed through said slots, said cover plate being provided with second numerical indicia across the top thereof marking said columns in said multiplication table and being provided with third numerical; indicia at the side thereof marking said rows in said multiplication table; and, a plurality of slides positioned in said slots between said base plate and said cover plate, each of said slides being capable of sliding movement between a first position wherein said numerical indicia in one of said rows is covered thereby and a second position wherein said numerical indicia in the same one of said rows is uncovered thereby.

* * * * *